United States Patent
Hulseman et al.

(10) Patent No.: US 8,720,047 B2
(45) Date of Patent: May 13, 2014

(54) METHOD FOR MAKING MICROSTRUCTURED OBJECTS

(75) Inventors: Ralph A. Hulseman, Greenville, SC (US); Robert E. Mammarella, Greer, SC (US); March Maguire, Clemson, SC (US)

(73) Assignee: Hoowaki, LLC, Pendleton, SC (US)

(*) Notice: Subject to any disclaimer, the term of this patent is extended or adjusted under 35 U.S.C. 154(b) by 628 days.

(21) Appl. No.: 12/813,833

(22) Filed: Jun. 11, 2010

(65) Prior Publication Data

US 2010/0319183 A1 Dec. 23, 2010

(30) Foreign Application Priority Data

May 8, 2009 (WO) ............... PCT/US2009/043306
May 8, 2009 (WO) ............... PCT/US2009/043307
Jul. 2, 2009 (WO) ............... PCT/US2009/049565

(51) Int. Cl.
*H01R 43/00* (2006.01)

(52) U.S. Cl.
USPC ............... 29/827; 29/825; 29/840; 29/874; 264/224; 264/313; 428/98; 428/183

(58) Field of Classification Search
USPC ....... 29/825, 827, 830, 840, 33 H, 33 M, 745, 29/746, 747, 874; 264/224, 225, 226, 227, 264/313; 428/98, 183
See application file for complete search history.

(56) References Cited

U.S. PATENT DOCUMENTS

| 4,373,127 A * | 2/1983 | Haskett et al. ............. 219/69.15 |
| 5,234,655 A * | 8/1993 | Wiech, Jr. ..................... 264/227 |
| 6,224,816 B1 * | 5/2001 | Hull et al. ..................... 264/401 |
| 2009/0072428 A1 * | 3/2009 | Lizotte et al. ................. 264/101 |

* cited by examiner

*Primary Examiner* — Peter DungBa Vo
*Assistant Examiner* — Jeffrey T Carley
(74) *Attorney, Agent, or Firm* — McNair Law Firm, P.A.; Douglas W. Kim; Douglas L. Lineberry

(57) ABSTRACT

Described herein are casting and molding methods useful for making microstructured objects. By including a plurality of microfeatures on the surface of an object, other characteristics may be imparted to the object, such as increased hydrophobicity. Some of the casting and molding methods described herein further allow for manufacture of objects having both microfeatures and macro features, for example microfeatures on or within macro features or selected macro feature regions.

30 Claims, 8 Drawing Sheets

708

METHOD FOR MAKING MICROSTRUCTURED OBJECTS

CLAIM OF PRIORITY

This application claims the benefit of and priority of PCT Patent Application: US09/43306, "Method of Manufacturing Microstructures", filed on May 8, 2009; PCT Patent Applications: US09/43307, "Flexible Microstructured Superhydrophobic Materials", filed on May 8, 2009 and PCT Patent Application: US09/49565, "Casting Microstructures into Stiff and Durable Materials from a Flexible and Reusable Mold", filed on Jul. 2, 2009 incorporated by reference and pursuant to 35 U.S.C. §111.

FIELD OF THE INVENTION

This invention is in the field of electroforming and electrical discharge machining (EDM) methods. This invention relates generally to methods of making microstructured objects by electroforming and by electrical discharge machining.

BACKGROUND OF THE INVENTION

Microfeatures placed on an object can provide for advantageous surface properties for such an object. By including a plurality of microfeatures on the surface of an object, other characteristics may be imparted to the object, such as increased hydrophobicity, hydrophilicity, self-cleaning ability, hydro-dynamics drag coefficients, aerodynamic drag coefficients, frictional properties, and optical effects. Take the development that has been put into superhydrophobic surfaces. Superhydrophobic surfaces were first inspired by the characteristic water repellency of the lotus leaf. There are also a number of surfaces found in nature in both the plants and insects that exhibit these water repelling properties. Research and development has been put into developing surfaces mimicking nature that can reduce the contact angle hysteresis of water by maintaining an air-water interface above the depressions between the peaks of the surface roughness. It has also been shown that it is advantageous to have multiple levels of roughness in order to increase advancing and receding contact angles while simultaneously minimizing hysteresis.

However, historically, these microfeatures were applied to surfaces as coating or adhesives and therefore are prone to wear off the surface. Over time the properties provided by the microstructures are lost given the peeling or premature removal of the coating. Further, the coating can be difficult to apply consistent to curved surfaces and in applications such as molds or other industrial uses, can quickly wear aware from the manufacturing tool. Further, metal tools are frequently used for manufacturing and having such tools with microfeatures that are incorporated into the surface of the tool rather than applied as a coating would be advantageous, particularly if these tools were metal.

Therefore, it I an object of this invention to provide a manufacturing method for manufacturing articles resulting in a metal tool such as a mold or EDM head.

It is another object of this invention to provide a manufacturing method for manufacturing articles with microstructures integrated into their surfaces rather than through coatings.

It is another object of this invention to provide a manufacturing method for manufacturing articles having integrated microfeatures on curved surfaces.

SUMMARY OF THE INVENTION

The object above are achieved providing a method of manufacturing articles comprising the steps of: fabricating a microstructured prototype having microfeatures selected from a first set of patterns of microstructures; creating a microstructured intermediate from said microstructured prototype so that said intermediate has microfeatures that are a negative of said microstructures; creating a microstructured metal electrode from said microstructured intermediate having metal microfeatures from a method selected from a group consisting of: electroforming, metal injection molding and embossing; and, electrical discharge machining a microstructured metal tool from said microstructured metal electrode having tool microfeatures so that said microstructured metal tool is provided to replicate said selected pattern on a production part. The production can be created from materials selected from the group comprising: metals, foils, films, thermoplastics and reactive polymers that are cured by chemical, thermal or UV processes.

The preselected pattern of microfeatures is made using a method selected from the group consisting of photolithography, laser ablation, e-beam lithography, nano-imprint lithography and any combination of these. The microfeatures can have a pitch over the range of 10 nm to 200 µm, can have identical dimensions, and can have an aspect ratio selected over the range of 1:2 to 7:1.

The intermediate can be formed from the group of thermoplastic, thermoplastic polymer and rubber. The production part can be produced from the metal tool by casting, molding, stamping, imprinting, rolling, or embossing.

The microfeatures selected from said first set of patterns of microstructures have dimensions selected over the range of 10 nm to 200 µm; and, said microstructured prototype includes microfeatures selected from a second set of patterns of microstructures having dimensions selected over the range of 100 µm to 1 m. At least a portion of said microfeatures selected from said first set of patterns of microstructures can be incorporated with said microfeatures selected from said second set of patterns of microstructures. In one embodiment, a surface area in the range of 80% to 100% of said microstructured prototype is covered by said microfeatures selected from said second set of patterns of microstructures.

The metal tool can be a mold or electric discharge machining electrode. The electroformed metal tool, including the electric discharge machining electrode, can include metal or layers of metal selected from the group consisting of: copper, an alloy of copper, copper or an alloy of copper mixed with tungsten particles, nickel, an alloy of nickel, chromium, an alloy of chromium, silver, silver and tungsten mixtures and alloys or any combination of these. These metals can be in layers and the metals can include infiltrates.

The process of fabricating said microstructured prototype can include fabricating said microstructure prototype having a curved surface; creating said microstructured intermediate includes creating said microstructured intermediate having a shaped surface; electroforming said microstructured metal electrode includes electroforming said microstructured metal electrode having a shaped surface; and, electrical discharge machining said microstructured metal tool includes machining said metal tool having a shaped surface.

Fabricating said microstructured prototype can include the steps of: providing a semiconductor wafer, patterning the semiconductor wafer with said preselected pattern of microfeatures, molding an uncured flexible polymer to the patterned semiconductor wafer, curing the polymer, thereby forming a microstructured flexible polymer having said preselected pattern of microfeatures, removing said microstructured flexible polymer from said patterned semiconductor wafer and deforming at least a portion of said microstructured flexible polymer so as to conform the microstructured flexible polymer to at least a portion of the surface of the one or more macro scale features of said microstructured prototype. Fabricating said microstructured prototype can include the steps deforming at least a portion of the microstructured polymer is deformed to radius of curvature selected over the range of 100 µm to 3 m and can include deforming at least a portion of said microstructured polymer is deformed to a strain level selected over the range of 1% to 1300%. The semiconductor wafer can be patterning said semiconductor wafer using a method selected from the group consisting of: photolithography, laser ablation, e-beam lithography, nano-imprint lithography and any combination of these.

The microfeatures themselves can be selected from the group consisting of: holes, pillars, steps, ridges, curved regions and any combination of these and can have cross-sectional shapes selected from the group consisting of: circle, ellipse, triangle, square, rectangle, polygon, stars, hexagons, letters, numbers, mathematical symbols and any combination of these.

All references throughout this application, for example patent documents including issued or granted patents or equivalents, patent application publications, and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

BRIEF DESCRIPTION OF THE DRAWINGS

The description of the invention will be explained with reference to the following figures.

DETAILED DESCRIPTION OF THE INVENTION

Figure 1:
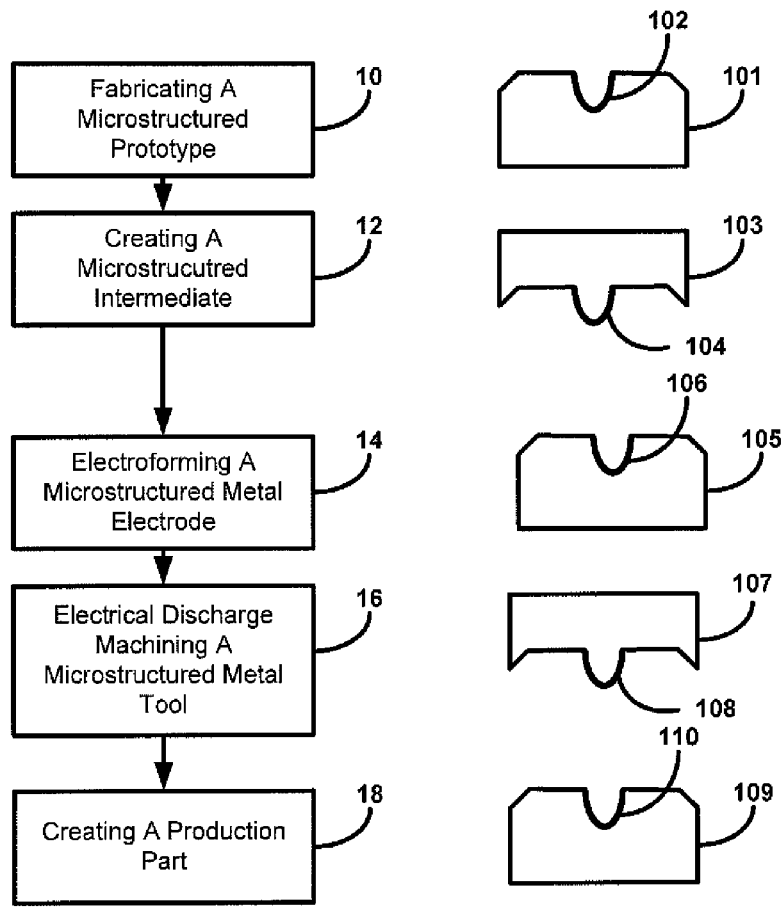
FIG. 1 a diagram and flowchart of the invention.

In general the terms and phrases used herein have their art-recognized meaning, which can be found by reference to standard texts, journal references and contexts known to those skilled in the art. The following definitions are provided to clarify their specific use in the context of the invention "Electroforming" refers to a metal forming process in which metal is deposited by an electro deposition or an electroless deposition process onto a substrate, which is known as a mandrel. After the process is completed, the metal part, known as an electroform, is removed from the mandrel. This process differs from electroplating in that in electroplating, the metal is applied to a substrate to enhance its surface properties or appearance and is meant to adhere strongly to the substrate; in electroforming, the metal is meant to be easily separated from the substrate and to exist as a self-supporting metal object.

EDM, or electrical discharge machining, is a process in which a workpiece is machined to a desired shape by the action of electrical discharges to remove bits of material from the workpiece surface. The EDM process comprises three key components: two electrodes separated by an insulator. The workpiece, typically a conductive material acts as one electrode. A dielectric liquid between the two electrodes acts as the insulator. The other electrode is known as an EDM head, tool-electrode, tool, or electrode. In operation, rapidly recurring electrical discharges between the two electrodes remove bits of material from the surface of the workpiece. These bits of material are flushed away in the dielectric liquid. Thus surface structures or microstructures in the surface of the tool electrode are replicated into the surface of the workpiece.

"Microstructured object" refers to an object having a plurality of microfeatures. Specific microstructured objects include microstructured prototypes, microstructured rubbers, microstructured engineering polymers, microstructured ceramics, microstructured metals and microstructured end products.

"Preselected pattern" refers to an arrangement of objects in an organized, designed or engineered fashion. For example, a preselected pattern of microfeatures can refer to an ordered array of microfeatures. In an embodiment, a preselected pattern is not a random and/or statistical pattern.

"Casting" or "molding" refers to a manufacturing process in which a liquid material or a slurry is poured or otherwise provided into, onto and/or around a mold or other primary object, for example for replicating features of the mold or primary object to the cast material. Casting methods typically include a cooling or curing process to allow the cast material to set and/or become solid or rigid. For some casting methods, features of the mold or primary object are incorporated in the cast material as it sets. In specific embodiments, materials such as rubber, ceramic and/or metal are cast from molds or primary objects which are compatible with the liquid or slurry material; that is, the molds or primary objects do not deform, melt, and/or are not damaged when brought into contact with the liquid or slurry material. Other commonly used molding processes include compression molding, where heat and pressure are applied to a thermoplastic material to soften or melt the material and force it to conform to the shape of the mold; and injection molding where melted thermoplastic materials are injected under pressure onto the surface of a mold, forcing the material to conform to the shape of the mold. [make sure this covers injection molding, compression molding and similar processes; also make roll cylinders by EDM]

"Stamping" "or embossing" refers to a manufacturing process in which a material is shaped or forced to take a pattern using a rigid mold or other primary object. Molding methods typically include placing the mold or primary object in contact with the material to be molded and applying a force to the mold, primary object and/or material to be molded. For some molding methods, features of the mold or primary object are replicated in the material to be molded during the molding process. In a specific embodiment, an end product, such as rubber, is molded from a patterned metal object. A common manufacturing technique, particularly for thin substrates, involves roll processing, in which a roller with a microstructured surface is applied with pressure and frequently with elevated temperature to the surface of a material in sheet or film form. The surface of the sheet is forced to conform to the microstructure of the roller in this continuous manufacturing method.

"Release agent" refers to a substance provided to the surface of a mold or primary object from which a rubber is to be cast to enhance and/or assist in the removal of the cast rubber from the mold or primary object. Specific release agents include materials selected from the group consisting of: napfin, paraffin wax, polysiloxanes, synthetic waxes, mineral oil, Teflon, fluoropolymers, silanes, thiols, other release agents known to those skilled in the art, and any combination of these. Some release agents are also useful as debonding agents.

"Production Part" refers to an object formed at the finish of a sequence of manufacturing steps. Some end products are suitable for use in a subsequent manufacturing process. Other end products, however, require additional processing, for example painting or other finalizing procedures. Some end products reach their final form at the finish of the sequence of manufacturing steps and are thus suitable for sale or for their intended use. Specific end products include, but are not limited to: moldable objects; sporting goods, such as grips, baseball bats, golf clubs, footballs, basketballs; cooking utensils; kitchenware; bathroom items such as toilets, sinks, tiles, bath tubs, shower curtains; handheld controllers, such as for gaming or equipment operation; bottles; computer keyboards; computer mice; jewelry; shoes; belts; helmets; pipes, including both inner and outer surfaces; candles; glass jars and jar lids; candy; turbine blades; pump rotors; heat sinks; insignia; windows; hoses; coolers; tires; wheels; and sheets of polymer.

"Prototype" refers to an object which serves as the basis for subsequent molding or casting processes. In an exemplary embodiment, a prototype is constructed to resemble or include the features of a final cast or molded object or end product.

"Flexible" refers to a property of an object which is deformable in a reversible manner such that the object or material does not undergo damage when deformed, such as damage characteristic of fracturing, breaking, or inelastically deforming. Flexible polymers are useful with the methods described herein. Specific flexible polymers include, but are not limited to: rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin and other flexible polymers known to those of skill in the art. In certain embodiments, flexible objects or materials can undergo strain levels selected over the range of 1% to 1300%, 10% to 1300%, or 100% to 1300% without resulting in permanent damage. In some embodiments, flexible objects or materials can be deformed to a radius of curvature selected over the range of 100 µm to 3 m without resulting in permanent damage.

"Macro mold" refers to an object mold for shaping or molding an object in a molding, casting or contact process. In some embodiments, a macro mold is used to simultaneously shape an object on a macro scale, for example where features are larger than 1 mm, such as 1 mm to 1 m, 1 cm to 1 m, or 5 cm to 1 m, and impart microfeatures to the surface of the object.

"Primary object" refers to the object used in a casting or molding process from which the cast or molded object takes its shape, pattern and/or features. In a specific embodiment, a primary object refers to a prototype or master object; however, a primary object can also refer to any object from which the cast or molded object takes its shape, pattern and/or features during a casting or molding process.

"Cast object" refers to the object which is formed during a casting process and is made of a cured and/or cooled liquid or slurry material.

"Microfeatures" and "microstructures" refers to features, on the surface of an object or mold, having an average width, depth, length and/or thickness of 100 µm or less or selected over the range of 10 nm to 100 µm. In certain embodiments, microfeatures are located on and/or within at least a portion of larger scale features (e.g., macro scale features) of an object, covering at least a portion of the surface area of the larger scale features are with microfeatures.

"Macro scale features" refers to features, on the surface of an object or mold, having an average width, depth, length and/or thickness of 100 µm or greater, for example 1 mm or greater, 5 mm or greater, 1 cm or greater, 5 cm or greater or selected over the range of 100 µm to 1 m, 1 mm to 1 m, 1 cm to 1 m or 5 cm to 1 m "Fidelity" refers to the quality of a cast or molded object; fidelity can also refer to the ability of features to be replicated in a cast or molded object during a casting or molding process. "High fidelity" specifically refers to the situation where a majority of the features of the mold or primary object are replicated in the molding or casting process to the cast or molded objects, for example 50% to 100% of the features, 75% to 100% of the features, 90% to 100% of the features or 100% of the features.

"Replication" and "replicate" refers to the situation where features are transferred and/or recreated during a casting or molding process. Replicated features generally resemble the original features they are cast or molded from except that the replicated features represent the negative of the original features; that is where the original features are raised features, the replicated features are recessed features and where the original features are recessed features, the replicated features are raised features. In a specific embodiment, micropillars in a master object are replicated as microholes in a cast object and microholes in the master object are replicated is micropillars in the cast object.

Methods are described herein for the production of microstructured objects. Specific methods are useful with one another, for example they can be performed in series for the manufacture of a sequence of microstructured objects. The microstructured objects made by the methods described herein include regions of microfeatures which can give the object a variety of useful properties. For example, the microfeatures can impart an increased hydrophobicity to an object and/or can give an object a self-cleaning ability. The microfeatures can also impart optical effects to an object, for example giving an object a prismatic effect, a specific color, or a directional dependent color change or color flop (e.g. the object appears a specific color when viewed from one angle and another color when viewed from another direction).

The microfeatures can also impart an increase of surface friction or grip to an object, or can give an object a specific tactile sensation such as feeling fuzzy, rough or squishy when touched. The microfeatures can also be located on a specific area or over the entire surface area of an object. For example, these embodiments can be useful for decreasing drag caused by turbulence of an object moving through a fluid (e.g., similar to the dimpling on a golf ball).

In a specific embodiment, the microfeatures can modify the heat transfer characteristics of an object, for example by changing the surface area of an object, changing how the surface interacts with fluids, or changing the behavior of nucleation sites. In a specific embodiment, the microfeatures can result in a decreased heat transfer by conduction, for example when the microfeatures have a high aspect ratio only the tops of the microfeatures will be in contact with another object for conductive heat transfer while the voids between surface features will not transfer heat well.

Microstructures can also be electrically conductive, for example metal microstructures or microstructures comprised of an electrically conductive polymers. These types of electrically conductive microstructures are useful, for example, as an array of electrical leads for electronic devices. The electrically conductive microstructures, for example, can be embossed directly onto the surface of an object.

FIG. 1 provides an overview of an exemplary method for making a microstructured object. A microstructured prototype is created at 10. A microstructured intermediate is created at 12. A microstructured metal electrode is created at 14 through the electroforming process but can also be created through metal injection molding processes or embossing processes. In one embodiment, the intermediate is a mandrel. In one embodiment, the intermediate is made from material selected from the group comprising: thermoplastic, thermoplastic polymer and rubber. Through electric discharging machining (EDM), a metal tool is created at 16. A production part is then created at 18. In one embodiment, the metal tool is an EDM head used to create a production part having microfeatures.

Further, a microstructured prototype 101 having a region of microfeatures 102 is provided on a curved surface of microstructured prototype 101. Next, an intermediate is created from the microstructured prototype 101, making a microstructured intermediate 103. The prototype microfeatures 102 are replicated in the creating process as intermediate microfeatures 104 on a curved surface of microstructured intermediate 103. This intermediate can be a flexible mandrel for use with electroforming. The metal electrode 105 is made by the electroform process but can also be made using processes such as metal injection molding and/or embossing. The microfeatures 104 are replicated in the electroforming process as electroformed metal microfeatures 106 on a curved surface of metal electrode 105. The electroformed metal microfeatures 106 are replicated in the electrical discharge machining process as metal microfeatures 108 on a curved surface of microstructured metal tool 107. Finally a production part is created from the microstructured metal 107, making production part 109. In one embodiment, the production part surface is roughed using a microstructured electrode to provide for surface characteristics that differ from the surface characteristics resulting prior to the surface roughing.

In one embodiment, a foil is machined using electric discharge machining from the metal electrode. This foil can made from a material selected from the group of carbide, silicon and metal. The foil can be processed using silicon micro processing to provide a modified microstructured metal tool. The foil can then be formed around an object selected from the group comprising: a 3D object, metal tool, mandrel, mold and die. A mandrel can be created from the microstructured intermediate for use in the electroforming process.

Figure 2:
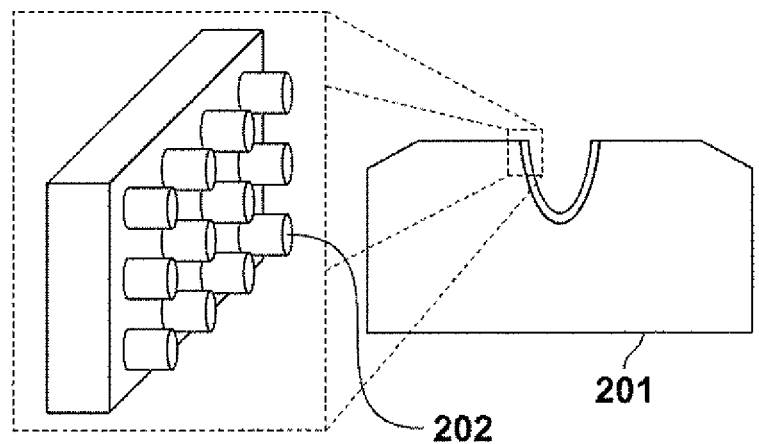
FIG. 2 is a diagram of the invention.

FIG. 2 depicts further detail of a portion of a microstructured prototype 201 showing an expanded view of microfeatures 202. In this embodiment, the microfeatures 202 are micropillars; that is they are cylindrically shaped structures extending from the surface of the prototype. For some embodiments, however, the microfeatures can include holes, pillars, steps, ridges, curved regions, recessed regions, raised regions, and any combination of these employing any cross-sectional shape including circles, ellipses, triangles, squares, rectangles, polygons, stars, hexagons, letters, numbers, mathematical symbols and any combination of these.

Figure 3:
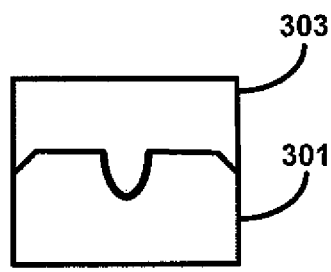
FIG. 3 is a diagram of the invention.
Figure 4:
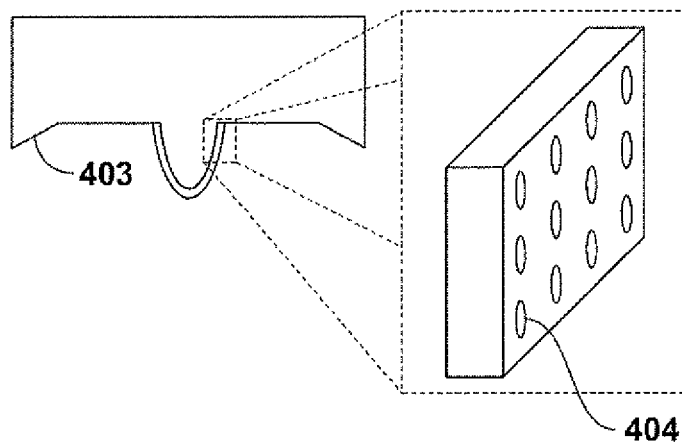
FIG. 4 is a diagram of the invention.

FIG. 3 shows a rubber 303 cast to a microstructured prototype 301. Microstructured prototype 301 can be used multiple times to cast rubber with high casting fidelity. FIG. 4 depicts further detail of a portion of a microstructured intermediate 403 showing an expanded view of microfeatures 404. In this embodiment, the microfeatures 404 are holes which represent the negative of micropillars such as shown in FIG. 2.

Figure 5:
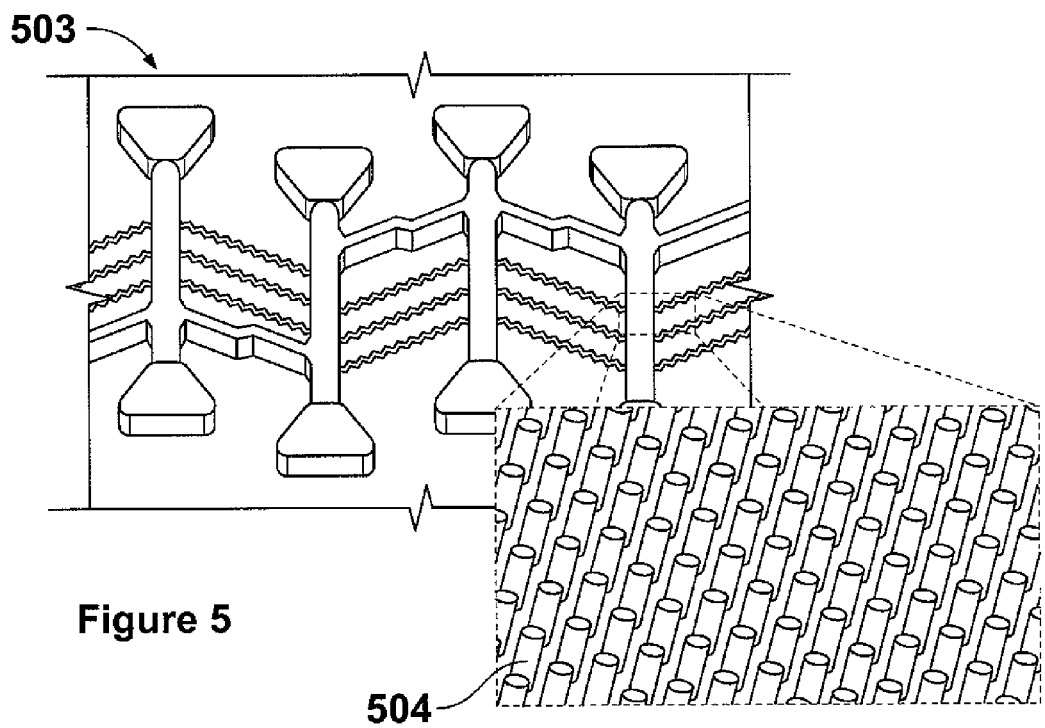
FIG. 5 is one embodiment of the invention.

FIG. 5 shows an image of a microstructured intermediate 503 created from a microstructured prototype, with an expanded image of microfeatures 504 replicated with high fidelity during the creation process.

Figure 6:
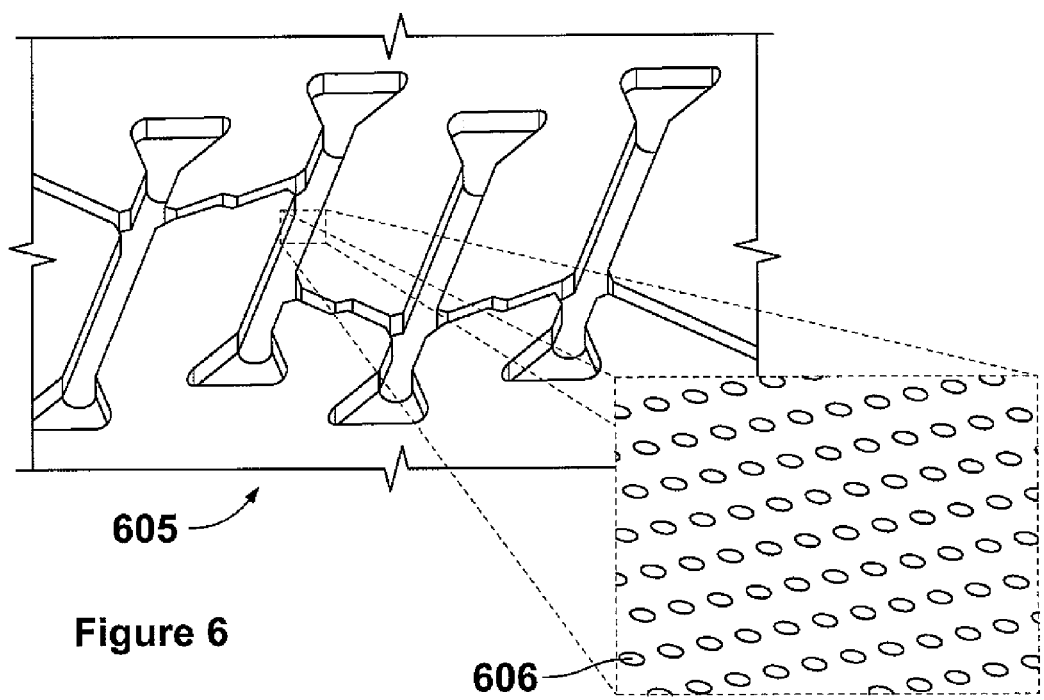
FIG. 6 is one embodiment of the invention.

FIG. 6 shows an image of a microstructured metal electrode 605 formed from a microstructured intermediate, with an expanded image of metal electrode microfeatures 606 replicated with high fidelity during the electroforming process. In one embodiment, a metal tool is electrical discharge machined from the metal electrode. In this embodiment, the microfeatures of the metal tool are holes representing the negative of pillars.

Figure 7:
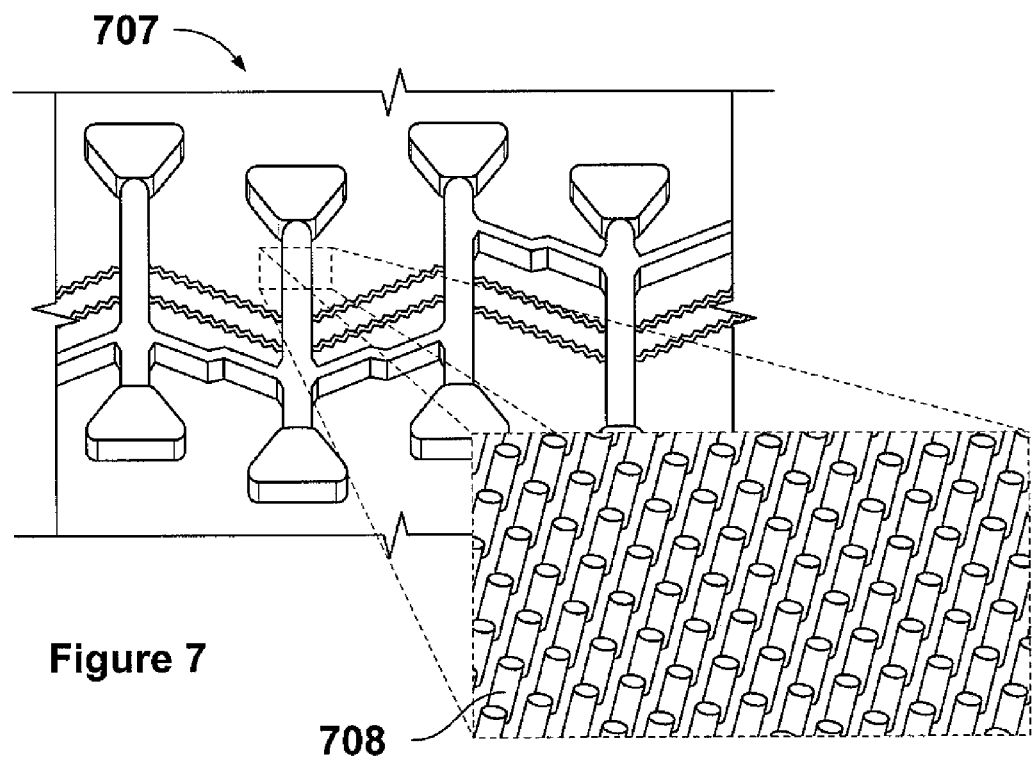
FIG. 7 is one embodiment of the invention.

FIG. 7 shows an image of a microstructured metal tool 707 machined by electrical discharge machining, with an expanded image of metal microfeatures 708 replicated with high fidelity during the machining process. The bar in the expanded image represents a distance of 200 μm.

Figure 8:
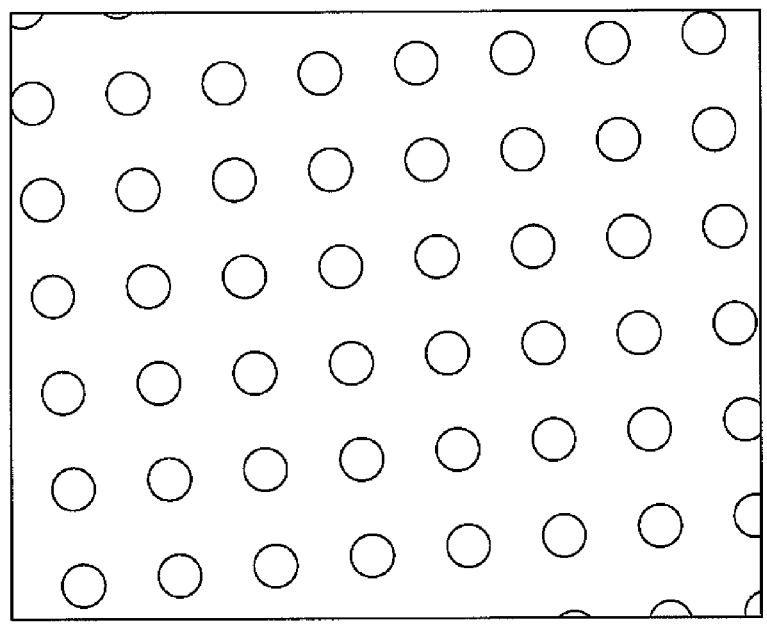
FIG. 8 is a portion of the invention.
Figure 9:
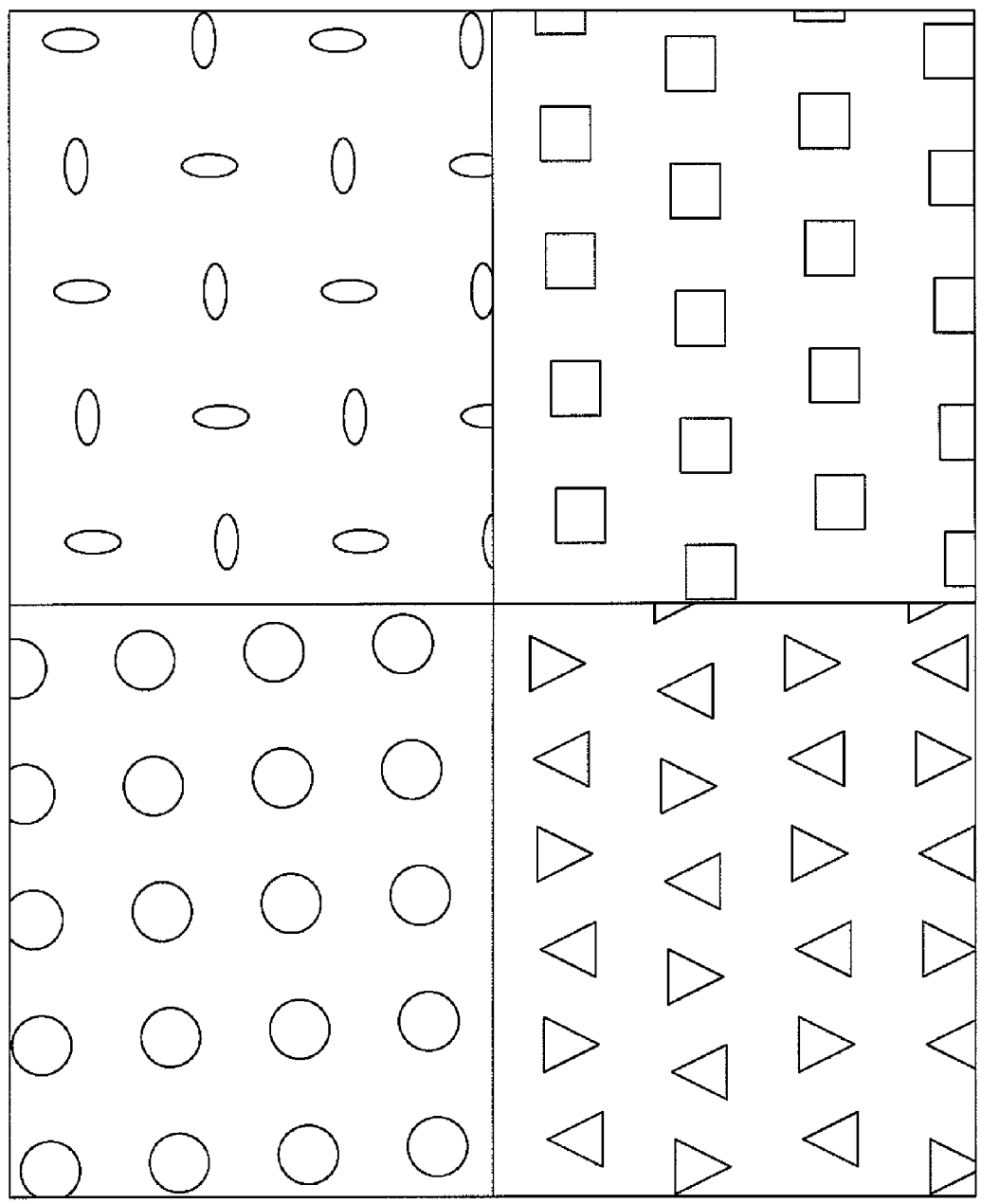
FIG. 9 is a portion of the invention.

FIG. 8 shows an image of microfeatures replicated with high fidelity during the casting or molding process. FIG. 9 shows images of additional microfeature embodiments having cross sectional shapes of circles, ellipses, triangles and squares. The ellipse and triangle embodiments show that there can be a variety of orientations of the cross sectional shapes. Other shapes and orientations are also possible and selected according to the desired physical properties of the surface carrying the microfeatures.

As described above, multiple embodiments are contemplated for providing a microstructured prototype. In a specific embodiment, a microstructured flexible polymer is attached to the surface of a prototype. The microstructured flexible polymer can be patterned using methods including, but not limited to drilling; milling; ion milling; machining; electro discharge machining; electroplating; ink jet printing; electrohydrodynamic ink jet printing; plasma etching; chemical etching; lithographic patterning techniques such as photolithography, x-ray lithography, electron beam lithography, soft lithography; embossing; stamping; molding; forging; etching with a plasma, gas or liquid; probe microscopy; atomic force microscopy; nano-indentation microscopy; chemical vapor deposition; physical vapor deposition; evaporation; electrospinning; or weaving microfibers or strands onto or into the surface.

Figure 10:
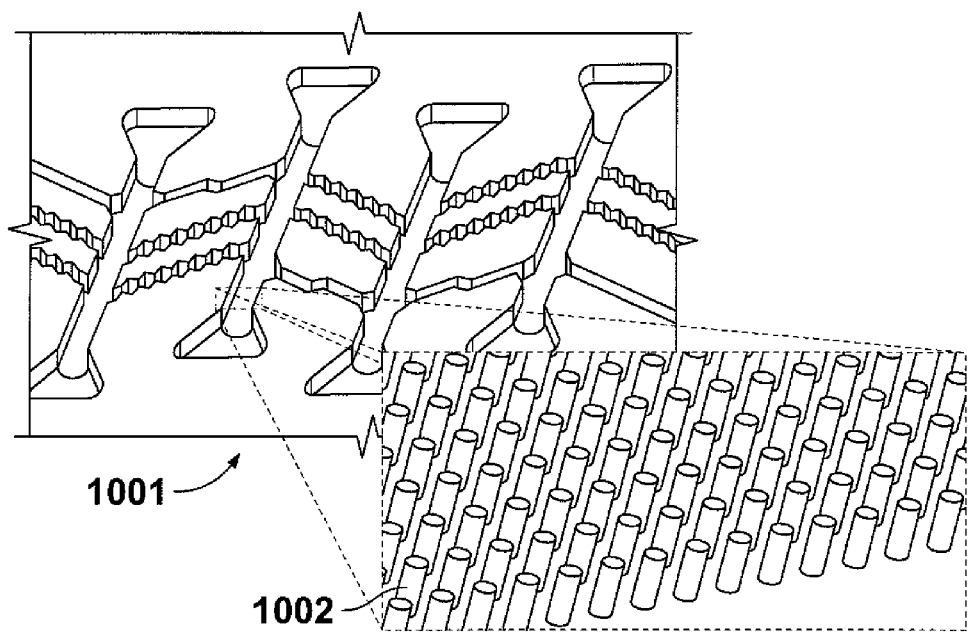
FIG. 10 is one embodiment of the invention.
Figure 11:
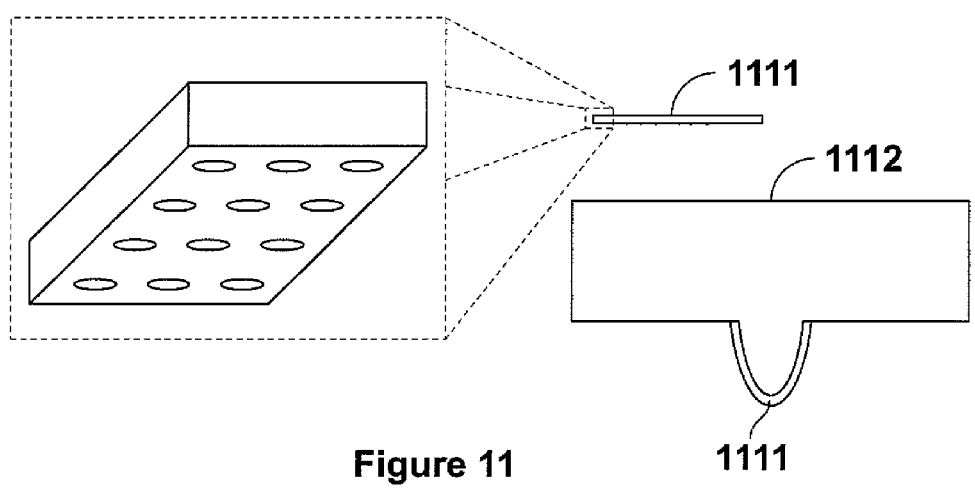
FIG. 11 is one embodiment of the invention.

FIG. 10 shows an image of one embodiment of prototype 1001 having a microstructured flexible polymer inserted into a groove. FIG. 10 also shows an expanded view image of a microstructured flexible polymer showing micro pillar type microfeatures 1002. In another embodiment, microstructures are molded directly onto the prototype. One method of achieving this comprises providing a microstructured flexible polymer 1111 as shown in FIG. 11 and attaching to the surface of a macro mold 1112. Next, an uncured polymer is placed into the desired position for microstructures on a prototype. A macro mold and microstructured polymer can be brought into contact with the prototype and uncured polymer where heat and pressure are applied to cure the uncured polymer. The resulting microstructured prototype will then have microfeatures. In one embodiment, the microstructured prototype has microfeatures directly molded onto the prototype.

Figure 12:
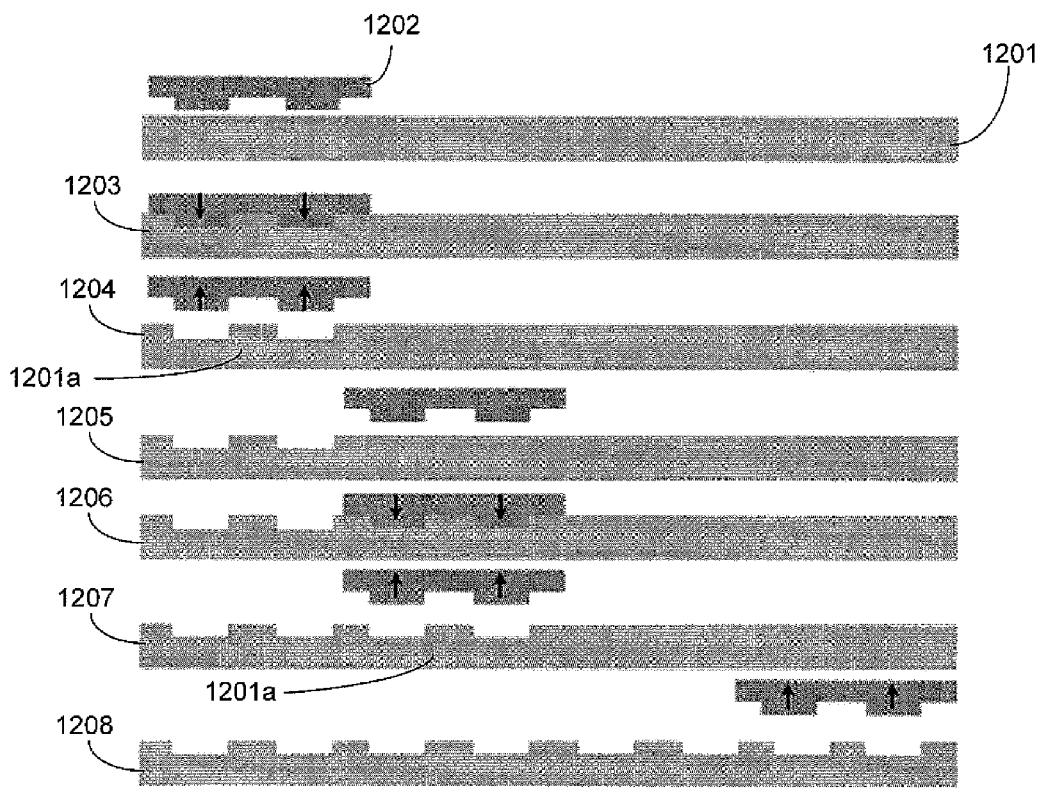
FIG. 12 is one embodiment of the invention; and,
FIG. 13 is one embodiment of the invention.

FIG. 12 further illustrates one method of creating microfeatures onto a curved surface. Initially, a microstructured master 1202 and EDM electrode material 1201 is provided. The microstructured master stamps a portion of the EDM electrode material at 1203. When the master releases the EDM electrode material, microstructures have been stamped into the EDM electrode material at 1204. Portion 1201*a* has then received microstructures resulting from the process. The master moves or steps to a new area of the EDM electrode material at 1205. The master stamps the EDM electrode material again at 1206 at the different location. The master releases the EDM electrode material again at 1207 from the second portion 1201*b*. After a plurality of stamp-and-step processes, a large section of the EDM electrode material has stamped microstructures at 1208.

When the invention is used on a flexible EDM electrode that has been generated through the stamp-and-step process, the EDM can be positioned on a substrate, such as a mold, to form a positive of the microfeatures or can be positions so as to provide for a negative of the microfeatures.

Figure 13:
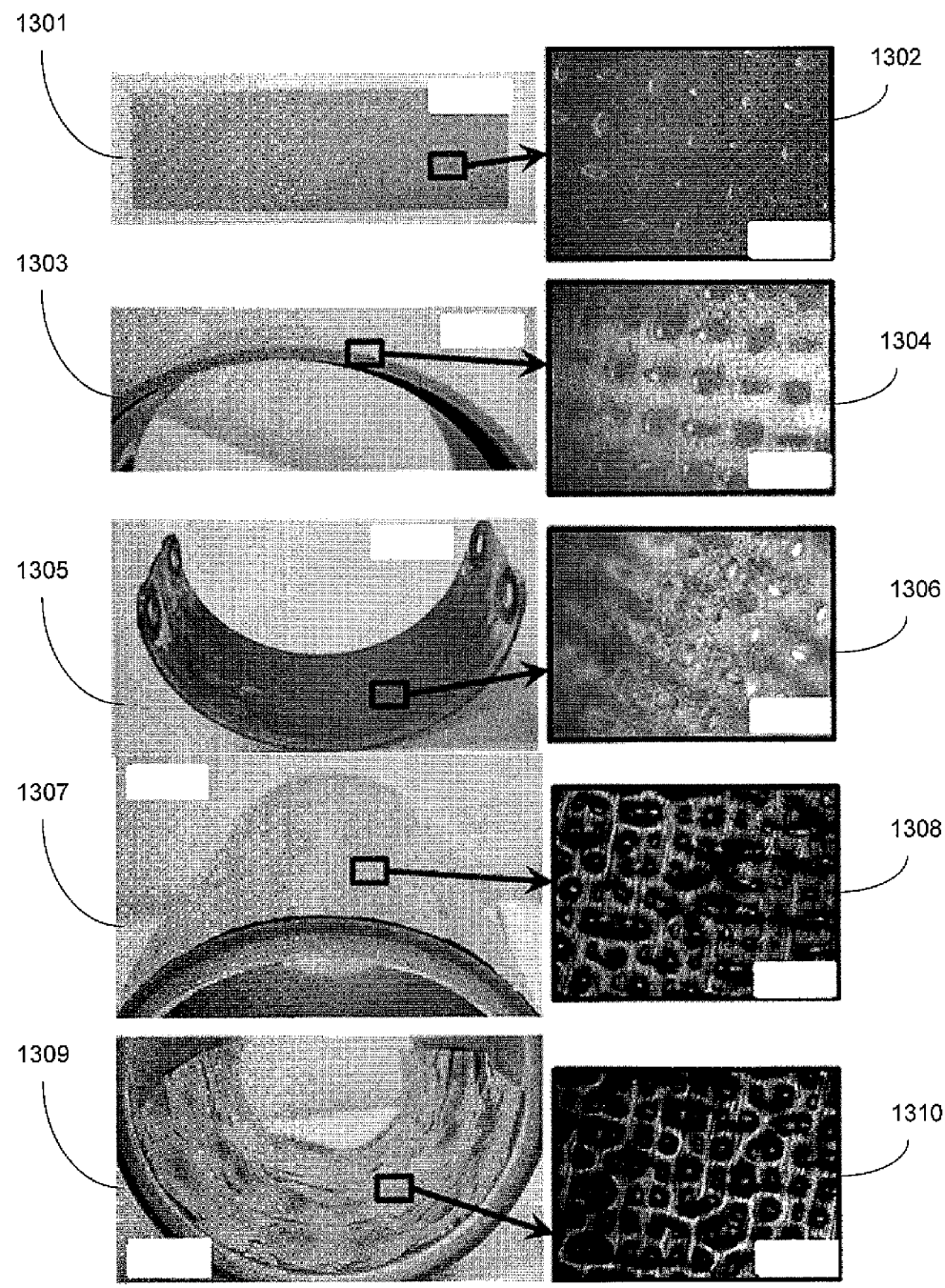

FIG. 13 shown a flexible microstructured mandrel 1301 carrying microfeatures 1302. Mandrel 1301 can be flexed in a curved shape 1303 resulting in a curved surface carrying microfeatures 1304. The curved mandrel can be used to electro form a metal tool 1305 having microfeatures on its curved surface 1306.

From the example provided in FIG. 12, a flexible EDM electrode material can be created by the stamp-and-step process onto a film or other thin electrode. The electrode can then be flexed onto a curved surface 1307 to provide for a positive curvature having a positively microstructured surface 1308 or flexed negatively as shown at 1309 providing a positively microstructured surface 1310.

In one embodiment, the electrode material can manufactured through stamping microstructures onto the production part using an EDM head that is the metal tool. For a specific example of this embodiment, holes can be created having a diameter of 100 μm with the EDM electrode material being 30 μm thick using an EDM electrode material made form copper and a electrode material of stainless steel. In this embodiment, the holes fully penetrate the EDM electrode material so as to provide a process for producing EDM electrode material microfeatures having larger heights than previously obtainable.

The invention may be further understood by the following non-limiting examples.

EXAMPLE 1

Microstructure Forming Process Chain and Process Details

This example describes a method of generating microstructures into the curved surfaces of two different material classes: rubber and metal. In this embodiment, the creation process begins with a prototype that has microstructures incorporated into its curved surface. An intermediate, rubber in one embodiment, is carried by a curved surface of the microstructured prototype, a metal electrode is generated through electroforming on the curved surface of the microstructured prototype. However, the metal electrode could be created using metal injection molding and/or embossing. A metal tool is then generated from the metal electrode. In one embodiment, the metal electrode is used to electrical discharge machine a metal tool resulting in a microstructured curved metal mold surface that can be used for the production part. The microstructures replicate through the steps of the process chain.

While this example describes the microstructured prototype with micropillars, this process is not limited to micropillars. The microstructured prototype could have microholes or other geometry types that would replicate through all steps in the process chain.

In one embodiment, a release agent is sprayed onto the microstructured prototype to ease demolding the intermediate, such as rubber, from the microstructured prototype. One release agent that has been used is by Ciba Specialty Chemicals and is composed of napfin, paraffin wax, polysiloxanes, synthetic waxes, and mineral oil. When rubber is cast from the microstructured prototype, the microstructures from the microstructured prototype replicate into the microstructured rubber intermediate. A vacuum of 22 in Hg assisted the casting of rubber into the microstructured prototype. In this example, microholes are cast into the microstructured rubber from micropillars in the microstructured prototype.

When the microstructured metal tool is used to casts or molds the production part, the microstructured metal surface replicates into the production part. In this example, microholes from the microstructured metal tool cause micropillars to be created into the microstructured production part. While molding created this specific end product, casting methods can also be used. A variety of shapes can be used for the microfeatures that are present on the production part. For example, 10-50 μm wide circles, ellipses, triangles, and squares have been produced into the production part with heights ranging from 35-70 μm. Microstructures with an aspect ratio of 7:1 (height:width) have been created into production parts. Further, the circles and ellipses show that this process can be used to produce round microstructures in the production part. The triangles and squares show that this process can be used to produce sharp-cornered straight-edged microstructures in the production part.

EXAMPLE 2

Fabrication Method for Tailored Micrometer-Scale and Nanometer-Scale Structures

In one embodiment, fabricating Lithographically Defined Arrays of Micro/Nanostructures (LDAMN) can be used. The technique begins with a substrate topped with a photosensitive polymer or resist sensitive to light or particles. By shining light through a stencil mask onto the resist, micrometer-scale or nanometer-scale structures can be formed in the resist. Other kinds of electromagnetic waves, energy beams, or particles can also be used to form these microstructures or nanostructures. The structures can be arrayed into patterns or not, but their key characteristic is that the manufacturing process controls their size, shape, and position with micrometer-scale or nanometer-scale accuracy and precision.

The resist having tailored microstructures or nanostructures can be used as a mold at this stage. The substrate can also be treated (for example with a chemical etch) to modify the microstructures. Furthermore, the surface can be coated with an agent to ease or improve subsequent molding steps.

Uncured polymer can be molded into the microstructures and cured by heat, time, UV light or other curing methods. When the cured polymer is removed from the substrate-resist mold, the structures from the mold are transferred into the polymer, and are also mechanically flexible.

Further, the process of integrating the polymer having tailored microstructure or nanostructures into millimeter-scale or centimeter-scale grooves is described. The process begins with the flexible polymer sheet having the microstructures and a structure suitable for receiving the flexible polymer sheet. Adhesive is applied to the cm-scale grooves of the receiving structure, and the flexible polymer sheet is inserted into the cm-scale grooves. Once the adhesive cures, the flexible polymer sheet is securely bonded to the structure. The combined structure is now suitable for subsequent molding and/or casting steps.

EXAMPLE 3

Reusability of Microstructured Objects and Heterogeneity of Microfeatures

A microstructured prototype having a preselected pattern of microfeatures can be fabricated in this example. In this embodiment, the preselected pattern included two regions of different microfeature shapes. The first region included micropillars 100 μm tall with 100 μm wide triangular cross-sectional shapes. The second region included micropillars 100 μm tall with 100 μm wide circular cross-sectional shapes.

An intermediate can be cast to the microstructured prototype to create a first microstructured intermediate object. The microstructured intermediate object thus produced included the two regions of different microfeature shapes formed from the casting of those of the microstructured prototype. The first region formed microholes 100 μm deep with 100 μm wide triangular cross-sectional shapes in the microstructured rubber. The second region formed microholes 100 μm deep with 100 μm wide circular cross-sectional shapes in the microstructured rubber.

Once the first microstructured intermediates was removed from the microstructured prototype, the intermediate was again cast to the microstructured prototype to create a second microstructured intermediate object having microfeatures matching those of the first microstructured intermediate object. In one embodiment, the intermediate is made from rubber.

Next, steel can be electrical discharge machined to the second microstructured metal electrode object to create a microstructured steel object. The microstructured steel object thus produced included the two regions of different microfeature shapes formed from the electrical discharge machining of those of the second microstructured metal electrode object. The first region formed microholes 100 μm deep with 100 μm wide triangular cross-sectional shapes in the microstructured rubber. The second region formed microholes 100 μm deep with 100 μm wide circular cross-sectional shapes in the microstructured rubber. The microstructured prototype can include curved regions which were transferred during the multiple electrical discharge machining steps to the microstructured steel.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for manufacturing a microstructured manufacturing article comprising the steps of:
    fabricating a microstructured prototype having microfeatures with a microstructure pattern selected from a first set of patterns of microstructures;
    creating a microstructured intermediate from said microstructured prototype so that said intermediate has microfeatures that are a negative of said selected pattern of microstructures;

creating a microstructured metal electrode from said microstructured intermediate having metal microfeatures from a method selected from the group consisting of electroforming, metal injection molding and embossing;

electric discharge machining a microstructured metal tool from said microstructured metal electrode, said microstructured metal electrode having tool microfeatures so that said microstructured metal tool is provided to replicate said selected pattern on a production part, wherein size dimensions of the selected pattern of microstructures remain substantially constant during manufacturing; and wherein said microfeatures include a pitch selected generally within the range of 10 nm to 100 μm.

2. The method of claim 1 wherein said microstructured intermediate is formed from a material from the group consisting of: thermoplastic, thermoplastic polymer and rubber.

3. The method of claim 1 including the step of creating a production part from said microstructured metal tool using a method selected from the group consisting of casting, molding, stamping, imprinting, rolling and embossing thereby providing a production part having microfeatures.

4. The method of claim 1 wherein said metal tool is a mold.

5. The method of claim 1 wherein:
said microfeatures selected from said first set of patterns of microstructures have dimensions selected generally within the range of 10 nm to 200 μm; and,
said microstructured prototype includes macrofeatures selected from a second set of patterns having dimensions selected generally within the range of 100 μm to 1 m.

6. The method of claim 5 wherein at least a portion of said microfeatures selected from said first set of patterns of microstructures are incorporated with said macrofeatures selected from said second set of patterns of microstructures.

7. The method of claim 6 wherein a surface area in the range of 80% to 100% of said microstructured prototype is covered by said macrofeatures selected from said second set of patterns.

8. The method of claim 1 wherein said preselected pattern of microfeatures is made using a method selected from the group consisting of photolithography, laser ablation, e-beam lithography, nano-imprint lithography and any combination of these.

9. The method of claim 1 wherein said microstructured metal tool is an electric discharge machining electrode.

10. The method of claim 1 wherein each of said microfeatures in said preselected pattern have identical dimensions.

11. The method of claim 1 wherein at least one of said microfeatures has an aspect ratio selected generally within the range of 1:2 to 7:1.

12. The method of claim 1 wherein:
fabricating said microstructured prototype includes fabricating said microstructure prototype having a curved surface;
creating said microstructured intermediate includes creating said microstructured intermediate having a shaped surface;
creating the microstructured metal electrode from said microstructured intermediate having a shaped surface via electroforming; and,
electrical discharge machining said microstructured metal tool includes machining said metal tool having a shaped surface.

13. The method of claim 1 where said microstructured metal tool is electroformed and includes metal selected from the group consisting of:
silver, silver mixed with tungsten particles, copper, an alloy of copper, copper or an alloy of copper mixed with tungsten particles, nickel, an alloy of nickel, chromium, an alloy of chromium, or any combination of these.

14. The method of claim 1 where said microstructured metal tool is electroformed and comprised of layers of metal selected from the group consisting of:
silver, silver mixed with tungsten particles, copper, an alloy of copper, copper or an alloy of copper mixed with tungsten particles, nickel, an alloy of nickel, chromium, an alloy of chromium, silver, silver mixed with tungsten particles and any combination of these.

15. The method of claim 1 including the step of creating a production part from said microstructured metal tool having surface properties selected from the group, consisting of hydrophobicity, hydrophilicity, self-cleaning ability, hydrodynamics drag coefficients, aerodynamic drag coefficients, frictional properties, and optical effects.

16. The method of claim 1 wherein fabricating said microstructured prototype includes the steps of:
providing a semiconductor wafer, patterning the semiconductor wafer with said preselected pattern of microfeatures, molding an uncured flexible polymer to the patterned semiconductor wafer, curing the polymer, thereby forming a microstructured flexible polymer having said preselected pattern of microfeatures, removing said microstructured flexible polymer from said patterned semiconductor wafer and deforming at least a portion of said microstructured flexible polymer so as to conform the microstructured flexible polymer to at least a portion of the surface of the one or more macro scale features of said microstructured prototype.

17. The method of claim 16 wherein in said step of deforming at least a portion of the microstructured polymer is deformed to radius of curvature selected generally within the range of 100 μm to 3 m.

18. The method of claim 16 wherein in said step of deforming at least a portion of said microstructured polymer is deformed to a strain level selected generally within the range of 1% to 1300%.

19. The method of claim 16 wherein patterning the semiconductor wafer includes patterning said semiconductor wafer using a method selected from the group consisting of:
photolithography, laser ablation, e-beam lithography, nano-imprint Lithography and any combination of these.

20. The method of claim 1 wherein fabricating said microstructured prototype includes providing a semiconductor wafer, patterning the semiconductor wafer with said preselected pattern of microfeatures, molding an uncured first polymer to the patterned semiconductor wafer, curing the first polymer, thereby forming a microstructured flexible polymer having said preselected pattern of microfeatures, removing the microstructured flexible polymer from said patterned semiconductor wafer, providing a macro mold having one or more macro scale features, deforming at least a portion of said microstructured flexible polymer so as to conform the microstructured flexible polymer to at least a portion of the surface of the one or more macro scale features of the macro mold, depositing an uncured second polymer onto at least a portion of a surface of the one or more macro scale features of said microstructured prototype, bringing the macro mold and microstructured flexible polymer into contact with said microstructured prototype and said uncured second polymer, curing the uncured second polymer, thereby making a microstructured second polymer having said preselected pattern of microfeatures and releasing said macro mold and microstructured flexible polymer from said microstructured prototype and microstructured second polymer.

21. The method of claim 20 wherein in said step of deforming at least a portion of the microstructured polymer is deformed to a radius of curvature selected generally within the range of 100 μm to 3 m.

22. The method of claim 20 wherein in said step of deforming at least a portion of said microstructured polymer is deformed to a strain level selected generally within the range of 1% to 1300%.

23. The method of claim 20 wherein said step of patterning the semiconductor wafer includes the step of patterning said semiconductor wafer using a method selected from the group consisting of photolithography, laser ablation, e-beam lithography, nano-imprint lithography and any combination of these.

24. The method of claim 1 wherein said microfeatures are selected from the group consisting of:
holes, pillars, steps, ridges, curved regions and any combination of these.

25. The method of claim 1 wherein said microfeatures have cross-sectional shapes selected from the group consisting of: circle, ellipse, triangle, square, rectangle, polygon, stars, hexagons, letters, numbers, mathematical symbols and any combination of these.

26. The method of claim 1 wherein said production part is EDM material and a first portion of said production part is stamped with said metal tool, a second portion of said production part is stamped with said metal tool to provide a production part that has a portion larger than said microfeatured surface of said metal tool stamped with microstructures.

27. The method of claim 26 wherein said production part is electric discharge machining electrode material.

28. The method of claim 26 wherein said production part is a flexible electric discharge machining electrode material.

29. The method of claim 28 wherein said production part electric discharge machining electrode material is carried by a substrate having a positively curved surface so that said production part is positively curved.

30. The method of claim 28 wherein said production part electro discharge machining electrode material is carried by a substrate having a negatively curved surface so that said production part is negatively curved.

* * * * *

UNITED STATES PATENT AND TRADEMARK OFFICE
CERTIFICATE OF CORRECTION

PATENT NO.       : 8,720,047 B2  
APPLICATION NO.  : 12/813833  
DATED            : May 13, 2014  
INVENTOR(S)      : Hulseman et al.

Page 1 of 1

It is certified that error appears in the above-identified patent and that said Letters Patent is hereby corrected as shown below:

On the title page item (75), line 4, insert --William P. King, Champaign, IL (US)--

Signed and Sealed this  
Twenty-first Day of July, 2015

Michelle K. Lee  
*Director of the United States Patent and Trademark Office*